(12) United States Patent
Bekiroglu et al.

(10) Patent No.: US 9,596,298 B1
(45) Date of Patent: Mar. 14, 2017

(54) LOAD BALANCING IN A DISTRIBUTED PROCESSING SYSTEM

(71) Applicant: Google Inc., Mountain View, CA (US)

(72) Inventors: Kaya Bekiroglu, Seattle, WA (US); Vyacheslav Alekseyevich Chernyak, Seattle, WA (US)

(73) Assignee: Google Inc., Mountain View, CA (US)

( * ) Notice: Subject to any disclaimer, the term of this patent is extended or adjusted under 35 U.S.C. 154(b) by 215 days.

(21) Appl. No.: 14/144,826

(22) Filed: Dec. 31, 2013

(51) Int. Cl.
*G06F 15/173* (2006.01)
*H04L 29/08* (2006.01)
*G06F 9/50* (2006.01)
*G06F 9/52* (2006.01)

(52) U.S. Cl.
CPC ......... *H04L 67/1002* (2013.01); *G06F 9/505* (2013.01); *G06F 9/522* (2013.01); *H04L 67/1008* (2013.01)

(58) Field of Classification Search
CPC ....... G06F 9/522; G06F 9/505; H04L 67/1008
USPC .................. 709/238, 226, 243, 201; 718/105
See application file for complete search history.

(56) References Cited

U.S. PATENT DOCUMENTS

| 8,516,121 | B1 | 8/2013 | Telang | |
|---|---|---|---|---|
| 8,539,075 | B2 | 9/2013 | Bali | |
| 2003/0065646 | A1 | 4/2003 | Joseph | |
| 2003/0158940 | A1* | 8/2003 | Leigh | H04L 67/1008 709/226 |
| 2005/0256971 | A1* | 11/2005 | Colrain | G06F 9/505 709/238 |
| 2007/0250631 | A1 | 10/2007 | Bali | |
| 2009/0064168 | A1* | 3/2009 | Arimilli | G06F 9/522 718/105 |
| 2012/0109852 | A1 | 5/2012 | Lingam | |
| 2013/0232164 | A1 | 9/2013 | Bigney | |

* cited by examiner

*Primary Examiner* — Kyung H Shin (74) *Attorney, Agent, or Firm* — Fish & Richardson P.C.

(57) ABSTRACT

Methods, systems, and apparatus are described for load balancing in a distributed processing system. In one aspect, a method includes monitoring, for each data processor in a distributed processing system, a rate of cursor progress for the data processor based on timestamps of data units that have been processed, wherein the rate of cursor progress for each data processor specifies a rate of change of an oldest timestamp of an oldest data unit being processed by the data processor; determining a progress threshold for the distributed processing system based on the respective rates of cursor progress of the data processors; determining, based on a first rate of cursor progress for a first data processor, that the first rate of cursor progress does not meet the progress threshold; and in response to the determination, performing one or more load balancing operations on the distributed processing system.

18 Claims, 4 Drawing Sheets

LOAD BALANCING IN A DISTRIBUTED PROCESSING SYSTEM

BACKGROUND

This specification relates to load balancing in a distributed processing system.

Distributed processing systems are systems that include multiple data processors that can be assigned to perform various tasks, or processes. They may include, for example, thousands of data processors that are each capable of performing a number of different processes. Distributed processing systems may be used for processing large volume of data and/or for processing continuous streams of data. Distributed processing systems are often designed to process data quickly and efficiently by dynamically reallocating data processors to perform tasks as needed.

SUMMARY

In general, one innovative aspect of the subject matter described in this specification can be embodied in methods that include the actions of monitoring, for each data processor in a distributed processing system that includes a plurality of data processors, a rate of cursor progress for the data processor based on timestamps of data units that have been processed by the data processor, wherein the rate of cursor progress for each data processor specifies a rate of change of an oldest timestamp of an oldest data unit being processed by the data processor; determining a progress threshold for the distributed processing system based on the respective rates of cursor progress of the plurality of data processors; determining, based on a first rate of cursor progress for a first data processor of the plurality of data processors, that the first rate of cursor progress for the first data processor does not meet the progress threshold; and performing one or more load balancing operations on the distributed processing system in response to determining that the first rate of cursor progress for the first data processor does not meet the progress threshold. Other embodiments of this aspect include corresponding systems, apparatus, and computer programs, configured to perform the actions of the methods, encoded on computer storage devices.

These and other embodiments can each optionally include one or more of the following features. Determining a progress threshold may comprise: determining, based on the rate of cursor progress of each data processor in the distributed processing system, a distribution of cursor progress rates for the distributed processing system; and determining the progress threshold based on the distribution of cursor progress rates for the distributed processing system.

The method may further comprise: obtaining cursor progress rate history that specifies a historical distribution of cursor progress rates for the distributed processing system, and wherein the distribution of cursor progress rates for the distributed processing system may be determined based on the cursor progress history.

The progress threshold may be a multiple of a standard deviation of the distribution.

The method may further comprise: identifying an overhead for the one or more load balancing operations, the overhead specifying a cursor progress cost of performing the one or more load balancing operations, and wherein the progress threshold may be further based on the overhead.

The one or more load balancing operations may comprise one or more of: instructing one or more other data processors to process one or more data units currently being processed by the first data processor; splitting one or more data units being processed by the first data processor into multiple data units and instructing one or more other data processors to process one or more of the multiple data units; or throttling one or more other data processors of the distributed processing system.

Particular embodiments of the subject matter described in this specification can be implemented so as to realize one or more of the following advantages. Using a rate of cursor progress that is based on timestamps to load balance a distributed processing system allows for dynamic allocation and re-allocation of work from underperforming data processors to data processors capable of handling an increased workload. A load balancer that distributes work to data processors based on an amount of pending work may not realize that the particular data processor may be underperforming despite a relatively light workload. Similarly, a load balancer that distributes more work to data processors that are faster, e.g., in terms of processing speed or power, may not account for the complexity of work being performed by a fast data processor relative to the complexity of work being performed by other data processors. Using a rate of cursor progress enables a load balancer to determine the performance of data processors in terms of timestamp progress, as opposed to load balancing based simply on workload and/or processing speed. Load balancing based on rates of cursor progress may result in more efficient use of system resources by allocating and reallocating work and/or data processors in a manner designed to prevent wasted processing power, prevent unnecessary backlogs, and ensure a workload that is balanced based on performance.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A load balancer facilitates the distribution of work and the management of resources within a distributed processing system. The distributed processing system may include many data processors that can each be assigned to perform one or more processes on a set of data, and the load balancer can use various load balancing operations in a manner designed to avoid delays in the progress of work and improve efficiency of the distributed processing system.

Each data processor in the distributed processing system processes units of work, such as individual data records, batches of records, log files, or other types or categories of data. The load balancer monitors the progress of each data processor by tracking a rate of cursor progress for each data processor. A cursor is data or metadata that specifies a time for the low watermark, or tail, of data that has been or is being processed by a data processor. Each data processor's cursor is based on a timestamp of a data unit that has been processed by the data processor. For example, the cursor may be the oldest timestamp being processed by the data processor, or a time that the data processor specifies that all prior work has been completed. The rate of cursor progress for a data processor may specify, for example, the rate at which the oldest timestamp of an oldest data unit being processed by the data processor is updated. By tracking these cursors, the load balancer can determine a rate at which each data processor is progressing.

To determine which data processors are not progressing as expected, the load balancer uses a progress threshold that may be based on a rate of cursor progress. For example, the load balancer may use current and/or historical rates of cursor progress to determine a normal distribution of cursor progress rates for the system. Using the normal distribution, the load balancer may set a cursor progress threshold at, for example, two or three standard deviations.

The load balancer uses the progress threshold and the rates of cursor progress for each data processor to determine which data processors are processing within the determined progress threshold. For example, the load balancer may determine that a rate of cursor progress for a particular data processor fails to meet the progress threshold, indicating, that something is causing the particular data processor to process data slower than expected.

In response to determining that the rate of cursor progress for data processor fails to meet the progress threshold, the load balancer performs one or more load balancing operations on the distributed processing system. The load balancing operations are designed to advance cursor progress and cause underperforming data processors of the distributed processing system to operate within acceptable measures of cursor progress. Example load balancing operations include, for example, transferring units or work from an underperforming data processor to one or more other data processors, and throttling other data processors until the underperforming data processor begins to operate within acceptable measures of cursor progress.

Figure 1:
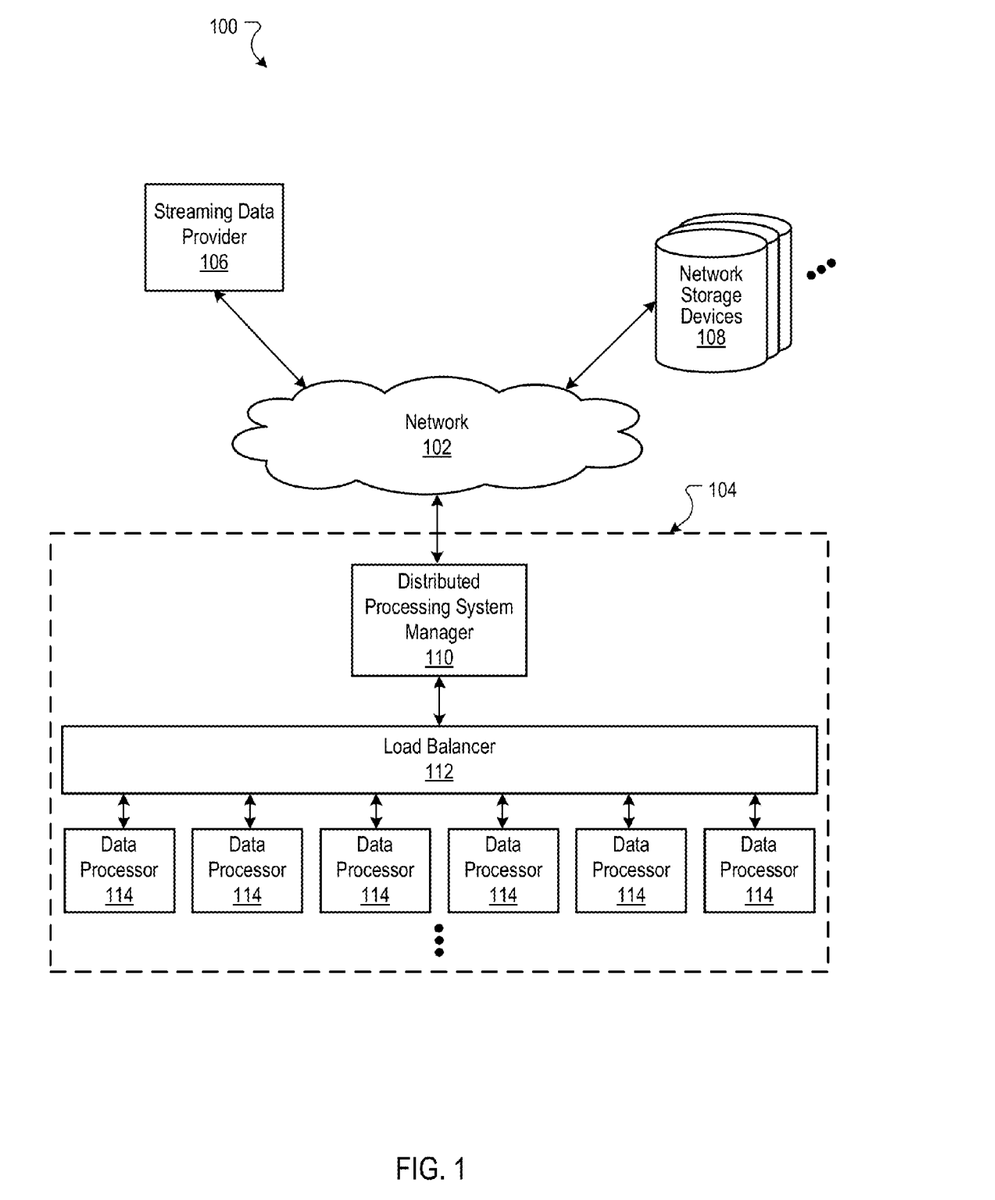
FIG. 1 is a block diagram of an example environment in which a distributed processing system operates.

FIG. 1 is a block diagram of an example environment 100 in which a distributed processing system operates. A computer network 102, such as a local area network (LAN), wide area network (WAN), the Internet, or a combination thereof, connects a distributed processing system 104, a streaming data provider 106, and one or more network storage devices 108. The distributed processing system 104 may include, for example, a distributed processing system manager 110, a load balancer 112, and multiple data processors 114. While the network storage devices 108 are depicted separately from the distributed processing system 104, they may also be included in the distributed processing system 104.

The streaming data provider 106 provides data for processing by the distributed processing system 104. The distributed processing system 104 may obtain data records and instructions for performing one or more processes on the data records. By way of example, the streaming data provider 106 may provide search query records to the distributed processing system 104 for filtering, sorting, and other analysis. Search query records may include, for example, search queries submitted to a search system and related information, such as a timestamp indicating a time that the query was received.

The distributed processing system manager 110 may perform process scheduling and resource management services for the data processing system 104, e.g., by assigning processes to be performed by one or more of the data processors 114, identifying and addressing faults and backlogs, and managing temporary and long-term storage. The load balancer 112, while depicted separate from the distributed processing system manager 110, may, in some implementations, be part of the distributed processing system manager 110. The load balancer 112 monitors data processors 114 in the distributed processing system to determine if and when load balancing is to be performed and facilitates the distribution and/or redistribution of the load between the data processors 114. Operation of the load balancer 112 is discussed in further detail below.

The distributed processing system 104 may include thousands of data processors 114 which can perform processes independently or in combination with other data processors 114. Each data processor 114 may be managed by the distributed processing system manager 110 and monitored by the load balancer 112. For example, when the distributed processing system 104 receives data records, the distributed processing system manager 110 may direct the data processors 114 to sort the data records, and the load balancer 112 can distribute the data records among data processors 114 in a manner designed to ensure data records are processed quickly and efficiently.

The streaming data provider 106 is an example data provider that provides data to be processed by the distributed processing system 104. By way of example, the streaming data provider 106 may be a search engine system that provides a constant stream of query records to the distributed processing system 104 for further processing. Query records may include, for example, search queries submitted to a search engine and related information, such as a timestamp indicating a time that the query was received, a device identifier for a device that submitted the query, and/or location data indicating a geographic location for the device that submitted the query. The distributed processing system manager 110 may direct the data processors 114 to filter the query records to remove queries that are considered spam, and the load balancer 112 may determine which incoming records should be given to which processor and/or when to move records queued for processing by one processor to the queue of another processor.

Network storage devices 108 provide temporary and long-term storage for the distributed processing system 104 and, in some implementations, for individual data processors 114, the distributed processing system manager 110, the load balancer 112, and/or the streaming data provider 106. While the network storage devices 108 are depicted separately, they may also be part of the distributed processing system 104.

While the example provided above references processing query records provided by a search engine system, records for other types of data may be provided to, and other types of processes may be performed by, the distributed processing system 104. In addition, many other data providers, including streaming and non-streaming data providers, such as providers of batch data, may provide data for processing by the distributed processing system 104.

For example, the data streaming data provider 106 may be a social network system that provides micro-blog records to the distributed processing system 104 for spam and malware detection. As another example, the distributed processing system 104 may perform batch processing on database records, such as querying and sorting batch processes. Other example data providers, such as image processing systems or network indexing systems, may also submit other types of information, such as image data or network resource data to be processed by one or more processes of a distributed processing system.

While the example environment 100 depicts the distributed processing system manager 110, load balancer 112, and network storage devices separately in FIG. 1, they may be combined as part of one or more distributed processing systems. Other configurations of the distributed processing system may also be used. For example, one or more components of the distributed processing system may communicate directly with other components—e.g., the data processors 114 may communicate directly with one another and/or directly with non-networked storage devices. In addition, one or more of the data processors 114 may be used to implement the distributed processing system manager 110 and/or load balancer 112. The operation of the load balancer 112 is described in further detail below.

Figure 2:
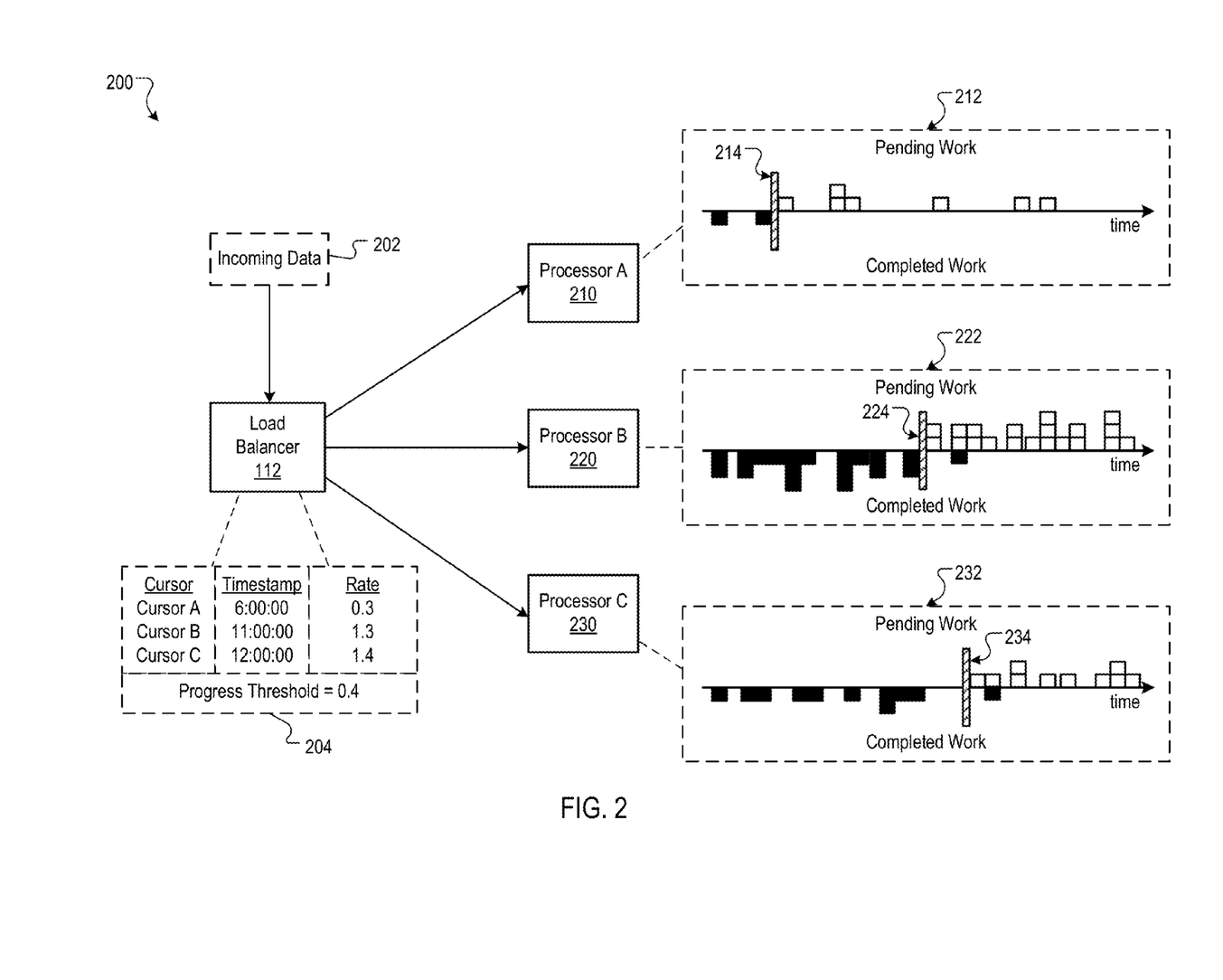
FIG. 2 is an illustration of an example process for load balancing a distributed processing system.

FIG. 2 is an illustration of an example process 200 for load balancing a distributed processing system. In the example process 200, the load balancer 112 manages the workload of three data processors, processor A 210, processor B 220, and processor C 230. The load balancer 112 receives incoming data 202 and distributes the data to the processors. For example, the incoming data 202 may be query records, and the load balancer 112 may distribute the incoming query records to the data processors that perform a spam filtering process. The work may be initially distributed to the processors in many ways. For example, a round robin distribution approach may be used, or each processor may be assigned a particular type of query, e.g., queries that begin with a-m can go to one processor, queries beginning with a n-z can go to a second processor, and queries beginning with a non-alphabetic character can go to a third processor. (e.g., a-f to one processor, g-q to another processor, and r-z to a third processor).

As the data processors process data, the load balancer 112 monitors the workload and progress of each data processor using a rate of cursor progress. As noted above, each data processor has a cursor that is based on a timestamp of a unit of data being processed by the data processor. In the example process 200, each cursor indicates the timestamp of the oldest record being processed, and each cursor is depicted in a queue of pending and completed work for each data processor. In each queue, pending records are shown above the timestamp axis, and completed records are shown below the axis. Queue 212 depicts a work queue for processor A 210 with a cursor 214, Cursor A, which indicates that the oldest unit of data being processed by processor A has a timestamp of 6:00:00. Queue 222 depicts a work queue for processor B 220 with a cursor 224, Cursor B, which indicates that the oldest unit of data being processed by processor B has a timestamp of 11:00:00. Queue 232 depicts a work queue for processor C 230 with a cursor 234, Cursor C, which indicates that the oldest unit of data being processed by processor C has a timestamp of 12:00:00.

The load balancer monitors 112 the rate of cursor progress for each data processor by monitoring a rate of change in cursor. In some implementations, the rate indicates a rate of change in the timestamps of the oldest record being processed with respect to a "real-time" rate. For example, a processor that is processing at a rate of 1.0 processes records at a rate that is equal to real clock time, e.g., at a rate of 1.0, it would take a processor one hour to process a stream of records beginning at 1:00:00 and ending at 2:00:00, or three hours to process a stream of records beginning at 5:00:00 and ending at 8:00:00. A processor that is processing at a rate of 2.0 would take 30 minutes to process a stream of records beginning at 1:00:00 and ending at 2:00:00, while a processor that is processing at a rate of 0.25 would take four hours to process the same stream of records. The rate at which a processor processes records may depend on many factors, such as the speed of the processor, the speed and amount of available memory, the number and complexity of the records to be processed, the complexity of the process being performed on the records, and any delays due to communications with one or more other data processors.

Example rates for the example data processors in the example process 200 are depicted in monitoring data 204. The rate of cursor progress for Cursor A is 0.3, the rate of cursor progress for Cursor B is 1.3, and the rate of cursor progress for Cursor C is 1.4. Each rate of cursor progress may be periodically updated. In some implementations, each data processor monitors and reports its own cursor and/or rate of cursor progress, e.g., by reporting the timestamp of the most recently processed record to the load balancer, or recording the timestamps in a data storage device accessible by the load balancer. In some implementations, the load balancer periodically polls data processors to determine progress, e.g., by checking the timestamps of records that are currently being processed, pending, and/or completed.

The load balancer 112 determines a progress threshold for the distributed processing system. In some implementations, the progress threshold represents a floor on cursor progress, and a data processor having a cursor progress below the threshold would be subject to one or more load balancing operations, which are described in further detail below. In some implementations, the load balancer 112 determines the progress based on the distribution of cursor progress rates for all or a sample of the data processors. For example, the progress threshold may be a multiple of a standard deviation of cursor progress rates. In the example process 200, the mean of the rates of cursor progress for processors A, B, and C is 1 (e.g., (0.3+1.3+1.4)/3), and the standard deviation is ~0.6. Using a single standard deviation threshold, any data processors with a rate of cursor progress below ~0.4 would be subject to load balancing.

Other methods or values may be used to determine the progress threshold. For example, the mathematical variance of the data processors' cursor progress, or a multiple thereof, may be used. The population standard deviation, population variance, or a multiple thereof, may be used when the progress threshold is based on a sample of the data processors' cursor progress. In some implementations, the progress threshold may be the N lowest performing processors, or the slowest M percent of the data processors, where N is a positive integer, and M is a value between 0 and 100. For example, the slowest 5% of data processors, in terms of rate of cursor progress and rounded either up or down, may be subject to load balancing.

In some implementations, the progress threshold is based on a measure of overhead for one or more load balancing operations to be performed. For example, certain load balancing operations, which are described in further detail below, may cost system resources and time, and may result in delaying cursor progress for one or more data processors. This cost, in terms of delay or system resources, can be estimated based on monitoring and or empirical evidence and used to adjust a progress threshold. In some implementations, a default overhead value may be selected by a system administrator or developer. By way of example, the overhead for shifting work from one data processor's queue to another data processor may have a fixed overhead of 0.05 standard deviations of rate of cursor progress, and the above example threshold of 0.4 may be adjusted to 0.35 to account for the cost of shifting work from one processor to another.

In the example process 200, the load balancer 112 may determine that the rate of cursor progress for Processor A 210, at 0.3, is below the progress threshold of 0.4. In response to that determination, the load balancer 112 performs one or more load balancing operations on the distributed processing system. The performance of load balancing operations may, in some implementations, further depend upon other factors. For example, if the rate of cursor progress for a particular process being performed is known to be erratic, e.g., based on historical observations of similar processes being performed on similar data, then a secondary threshold or grace period may be implemented. For example, if rates of cursor progress for a query sorting process are often erratic, the load balancer may, after determining that a cursor progress falls below the progress threshold, wait for a predetermined period of time before performing a load balancing operation. Another example factor may be the time since the last load balancing operation was performed. For example, if one or more load balancing operations were recently performed, the distributed processing system in general, or one or more of the particular data processers affected by the load balancing operation, may be subject to a grace period or secondary progress threshold before performing another load balancing operation.

In some implementations, a load balancing operation includes shifting work from one data processor to one or more other data processors. For example, Processor B 220 and/or Processor C can be instructed to process one or more of the pending units of work in the queue 212 for Processor A 210. The particular processor(s) to which work is shifted may depend on several factors. For example, the current rate of cursor progress, quantity of work, and/or complexity of work for the processor(s) to which work is shifted may be taken into account. Accordingly, in the example process 200, the load balancer 112 may determine that Processor C 230, which has the highest rate of cursor progress, will perform some of the currently pending work for Processor A 210.

In some implementations, a load balancing operation includes splitting data units being processed by a data processor into multiple data units, or sub-units, and instructing one or more other data processors to process the split data units. As with shifting work, how the units of work are split, and which processors will process the work, may depend on several factors, such as the complexity and quantity of the work to be split, and the current rate of cursor progress, quantity of work, and/or complexity of work for the processor(s) which will process the split work. In the example process 200, the load balancer 112 may split one or more of the units of work pending for Processor A 210 and instruct Processor B 220 and/or Processor C 230 to perform the split work.

In some implementations, a load balancing operation includes throttling one or more data processors. For example, if one data processor is slowly progressing, other data processors in the distributed processing system may be throttled to reduce their rate of cursor progress and allow the slowly progressing data processor time to increase its rate of cursor progress on its own. In the example process 200, the load balancer may throttle Processor B 220 and Processor C 230 for a predetermined period of time, until the rate of cursor progress Processor A 210 goes above the progress threshold, or until another load balancing operation is implemented.

Other load balancing operations may also be used, either alone or in combination with the above examples. The particular load balancing operation, or combination of operations, used by the load balancer may depend on several factors. For example, complex or large units of work that take a relatively long time to process may be a good candidate for a work splitting operation. If the data processing system encounters performance issues when one or more processors process at a significantly higher rate than the slowest data processors, throttling may be a good choice of load balancing operation. If the overhead for switching work from one processor to another is significant, or if the pending workload for a slowly progressing data processor is significantly smaller than currently processing and/or recently completed workload, then throttling may also be appropriate.

In some implementations, default load balancing operations may be chosen by an administrator or user of the distributed processing system. In some implementations, historic results of various load balancing operations may be used to predict which load balancing operation(s) is best, depending on the type and amount of data processors, the process being performed, and the nature of the units of work. For example, if a distributed processing system is sorting query records, and query records are historically non-complex, the sorting process is relatively quick, and the overhead for moving units of work is historically small, a load balancer 112 may, by default, shift query records from an underperforming data processor to one or more other data processors when load balancing is to be performed.

After performing one or more load balancing operations, the load balancer 112 may continue to monitor the distributed processing system, performing load balancing operations as needed an in accordance with the methods described above. In addition, the load balancer 112 may continue to be responsible for distributing incoming data 202 to the various data processors. The distribution of incoming data 202 to the data processors may depend on the rates of cursor progress or current load balancing operations. For example, if a load balancing operation shifted query records beginning with the letters 'A' through 'C' from a first data processor to a second data processor, incoming query records beginning with the letters 'A' through 'C' may continue to be assigned to the second data processor until the load balancer determines load balancing is no longer necessary.

In some implementations, the load balancer 112 may use the timestamp of a cursor, alone or in combination with the rate of cursor progress, to perform load balancing operations. For example, all cursors may be progressing at a rate above the threshold for rate of cursor progress, but one data processor may have started processing data with timestamps significantly behind the other processors. In this situation, the load balancer may perform load balancing operations on the data processor to improve the data processor's cursor, e.g., the timestamp of the oldest data being processed by that processor. In some implementations, a threshold for a cursor's timestamp may be used to determine whether load balancing should be performed on a data processor based on its cursor timestamp. The threshold may be determined in a manner similar to that of the threshold for a rate of cursor progress described above. For example, the threshold may be a fixed unit of time, such as three hours behind the average cursor timestamp or median cursor timestamp. As another example, the threshold may be a multiple of the standard deviation of the cursor timestamps, e.g., using a multiplier of two, the threshold for load balancing based on a mean cursor timestamp of 12:00:00 and a two hour standard deviation may be 08:00:00.

The load balancer 112 may cease one or more load balancing operations based on several factors. For example, if all work is completed, load balancing may cease. If the slowly progressing data processor increases its rate of cursor progress above the progress threshold, load balancing operations performed based on that data processor may be ceased. In some implementations, a second progress threshold may be used to determine when load balancing operations should cease, e.g., if a progress threshold is two standard deviations below the mean, the threshold for ending a load balancing operation may be the mean, or one standard deviation below the mean. When load balancing ends, the work currently pending for each of the data processors may remain the same or, in some implementations, work may be shifted back to a data processor originally responsible for the work. The manner in which load balancing operations are ended may be determined by an administrator or user of the distributed processing system in advance, or may be based on previously determined default values, e.g., determined by an administrator based on empirical evidence and history, or by determined by machine learning techniques designed to determine which methods perform better than others.

Figure 3:
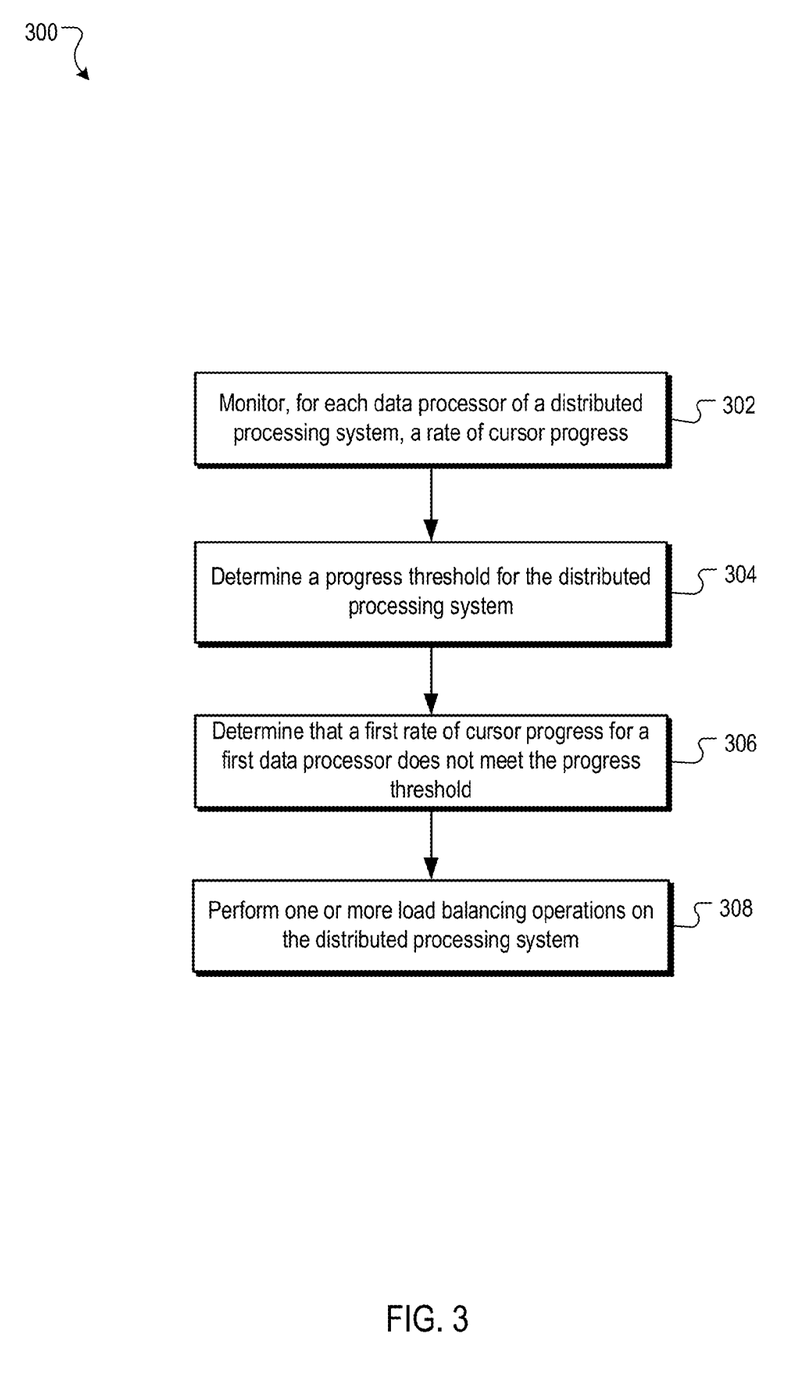
FIG. 3 is a flow diagram of an example process in which load balancing is performed in a distributed processing system.

FIG. 3 is a flow diagram of an example process 300 in which load balancing is performed in a distributed processing system. The process 300 may be performed by data processing apparatus, such as the load balancer described above.

For each data processor of a distributed processing system, a rate of cursor progress is monitored (302). The distributed processing system includes a set of data processors, and the rate of cursor progress for a data processor is based on timestamps of data units that have been processed by the data processor. The rate of cursor progress specifies, for a data processor, a rate of change of an oldest timestamp of an oldest data unit being processed by the data processor. For example, a distributed processing system may be used to sort database records, where each record has a timestamp. The timestamp may be the time the database record was created, or it may be assigned to the record when the record is received for processing by the distributed processing system. As each data processor sorts database records, a load balancer may determine, for each data processor, a rate by which the timestamp of the oldest record processed by the data processor is updated.

By way of example, the load balancer may identify, at a system time of 16:00:00, the oldest timestamp for a database record currently being processed by a particular data processor as 10:00:00. Five minutes later, at a system time of 16:05:00, the load balancer may identify the oldest timestamp for a database record currently being processed by the particular data processing apparatus as 10:04:00. This indicates that, for the five minute time period of 16:00:00 to 16:05:00, the cursor (e.g., the oldest timestamp) has progress by four minutes. The rate of cursor progress for that period of time would be 0.8, e.g., 4 minutes of cursor progress divided by 5 minutes of elapsed system time. Cursor progress may be measured over many other periods of time, e.g., every second, minute, or hour.

A progress threshold is determined for the distributed processing system (304). The progress threshold is based on the respective rates of cursor progress of the set of data processors. For example, the progress threshold may be a fraction of the average rate of cursor progress.

In some implementations, determining the progress threshold includes determining, based on the rate of cursor progress of each data processor in the distributed processing system, a distribution of cursor progress rates for the distributed processing system; and the progress threshold is determined based on the distribution of cursor progress rates. For example, the progress threshold may be a standard deviation below the mean rate of cursor progress. In some implementations, the progress threshold is a multiple of a standard deviation of the distribution. For example, the progress threshold may be 3 standard deviations below the mean rate of cursor progress.

In some implementations, cursor progress rate history is obtained that specifies a historical distribution of cursor progress rates for the distributed processing system, and the distribution of cursor progress rates for the distributed processing system is determined based on the cursor progress history. For example, the load balancer may have access to historical data regarding a prior sorting process performed on a stream of database records. The load balancer may identify a historical average rate of cursor progress, as well as a historical standard deviation, variance, etc., for the historical process. Using these historical values, alone or in combination with current cursor progress rates, the load balancer may determine a progress rate threshold for the current database record sorting process. The methods described above for determining a progress threshold using current data may also be used to determine a progress threshold based on historical data.

The process 300 determines, based on a first rate of cursor progress for a first data processor of the set of data processors, that the first rate of cursor progress for the first data processor does not meet the progress threshold (306). For example, a progress threshold may be 0.9, and a data processor's rate of cursor progress may be 0.8, in which case the load balancer determines that the rate of cursor progress for the data processor does not meet the 0.9 threshold.

One or more load balancing operations are performed on the distributed processing system in response to determining that the first rate of cursor progress for the first data processor does not meet the progress threshold (308). In some implementations, the load balancing operations include one or more of i) instructing one or more other data processors to process one or more data units currently being processed by the first data processor, ii) splitting one or more data units being processed by the first data processor into multiple data units and instructing one or more other data processors to process one or more of the multiple data units, and/or iii) throttling one or more other data processors of the distributed processing system.

For example, in response to determining that a particular data processor's rate of cursor progress is below a progress threshold, the load balancer may shift some pending database records from the particular data processor to the top 5% of data processors, e.g., the data processor(s) with a rate of cursor progress higher than the rates of cursor progress of 95% of the data processors in the distributed processing system. In addition, the load balancer may throttle every other data processor of the distributed processing system, e.g., by slowing down the processing speed of every data processor other than the particular data processor and the top 5% of data processors to which work was shifted.

In some implementations, an overhead is identified for one or more of the load balancing operations. The overhead specifies a cursor progress cost of performing the one or more load balancing operations. In these situations, the progress threshold may be further based on the overhead. For example, the load balancer may determine, based on administrative settings and/or historical performance measurements and analysis, that shifting work from one data processor to another has a rate cost of 0.001 per byte of data shifted. If the work to be shifted from one data processor to another is 50 bytes in size, the total overhead for the shift operation is 0.05 (e.g., 50×0.001). The progress threshold may, in turn, be reduced by 0.05, e.g., from 0.9 to 0.85. The overhead values need not be dynamic; for example, the overhead may be a fixed value for each load balancing operation, or a fixed value for any load balancing operation.

The distributed processing system may continuously monitor and periodically be subjected to load balancing operations throughout the performance of a process. As noted above, a load balancer may also distribute incoming work to data processors based on the rates of cursor progress. For example, incoming work can be assigned to data processors with the fastest rates of cursor progress. The load balancer may perform other tasks in addition to those described above, such as requesting additional data processors when a rate of cursor progress is below a threshold, or relinquishing control of data processors when a rate of cursor progress is above a threshold.

Figure 4:
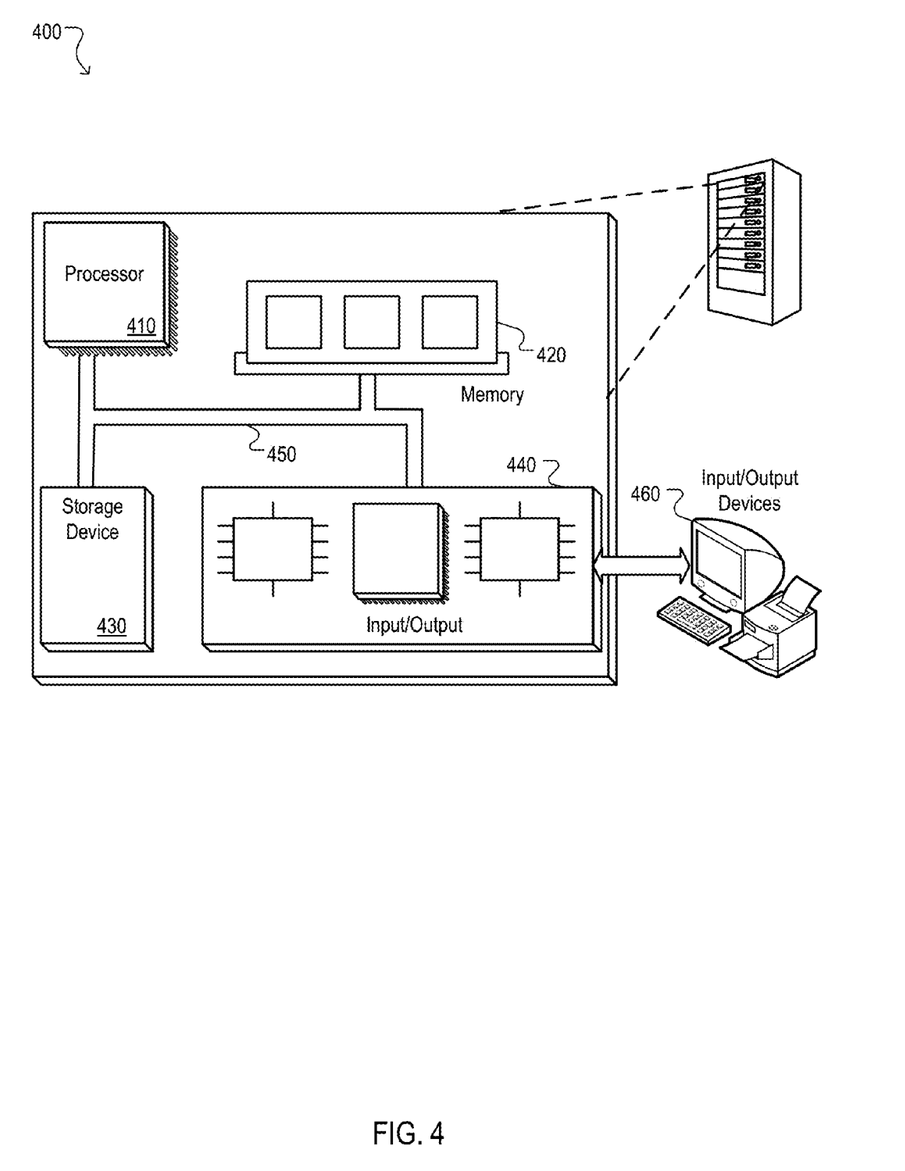
FIG. 4 is a block diagram of an example data processing apparatus.

FIG. 4 is a block diagram of an example data processing apparatus 400. The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
    obtaining, by a distributed processing system that includes a plurality of data processors, data units to be processed by the distributed processing system, each data unit having a corresponding timestamp that indicates a time the data unit was created, and wherein the time the data unit was created is prior to a time that the data unit is processed by the data processors;
    distributing the data units among the data processors for processing by the data processors;
    monitoring, for each data processor in the distributed processing system, a rate of cursor progress for the data processor based on the timestamps of the data units that have been processed by the data processor, wherein the rate of cursor progress for each data processor specifies a rate of change of an oldest timestamp of an oldest data unit being processed by the data processor based on the rate of change of the times indicated by the respective timestamps of each oldest data unit processed by the data processor;
    determining a progress threshold for the distributed processing system based on the respective rates of cursor progress processed by the plurality of data processors;
    determining, based on a first rate of cursor progress for a first data processor processed by the plurality of data processors, that the first rate of cursor progress for the first data processor does not meet the progress threshold; and performing one or more load balancing operations on the distributed processing system in response to determining that the first rate of cursor progress for the first data processor does not meet the progress threshold.

2. The method of claim 1, wherein determining a progress threshold comprises:
   determining, based on the rate of cursor progress of each data processor in the distributed processing system, a distribution of cursor progress rates for the distributed processing system; and
   determining the progress threshold based on the distribution of cursor progress rates for the distributed processing system.

3. The method of claim 2, further comprising:
   obtaining cursor progress rate history that specifies a historical distribution of cursor progress rates for the distributed processing system, and wherein the distribution of cursor progress rates for the distributed processing system is determined based on the cursor progress history.

4. The method of claim 2, wherein the progress threshold is a multiple of a standard deviation of the distribution.

5. The method of claim 2, further comprising:
   identifying an overhead for the one or more load balancing operations, the overhead specifying a cursor progress cost of performing the one or more load balancing operations, and wherein the progress threshold is further based on the overhead.

6. The method of claim 1, wherein the one or more load balancing operations comprise one or more of:
   instructing one or more other data processors to process one or more data units currently being processed by the first data processor;
   splitting one or more data units being processed by the first data processor into multiple data units and instructing one or more other data processors to process one or more of the multiple data units; or
   throttling one or more other data processors of the distributed processing system.

7. A system comprising:
   a data processing apparatus; and
   a data store storing instructions that, when executed by the data processing apparatus, cause the data processing apparatus to perform operations comprising:
   obtaining, by a distributed processing system implemented in the data processing apparatus, the distributed processing system including a plurality of data processors, data units to be processed by the distributed processing system, each data unit having a corresponding timestamp that indicates a time the data unit was created, and wherein the time the data unit was created is prior to a time that the data unit is processed by the data processors;
   distributing the data units among the data processors in the distributed processing system for processing by the data processors;
   monitoring, for each data processor in the distributed processing system, a rate of cursor progress for the data processor based on timestamps of data units that have been processed by the data processor, wherein the rate of cursor progress for each data processor specifies a rate of change of an oldest timestamp of an oldest data unit being processed by the data processor based on the rate of change of the times indicated by the respective timestamps of each oldest data unit processed by the data processor;
   determining a progress threshold for the distributed processing system based on the respective rates of cursor progress processed by the plurality of data processors;
   determining, based on a first rate of cursor progress for a first data processor processed by the plurality of data processors, that the first rate of cursor progress for the first data processor does not meet the progress threshold; and
   performing one or more load balancing operations on the distributed processing system in response to determining that the first rate of cursor progress for the first data processor does not meet the progress threshold.

8. The system of claim 7, wherein determining a progress threshold comprises:
   determining, based on the rate of cursor progress of each data processor in the distributed processing system, a distribution of cursor progress rates for the distributed processing system; and
   determining the progress threshold based on the distribution of cursor progress rates for the distributed processing system.

9. The system of claim 8, wherein the operations further comprise:
   obtaining cursor progress rate history that specifies a historical distribution of cursor progress rates for the distributed processing system, and wherein the distribution of cursor progress rates for the distributed processing system is determined based on the cursor progress history.

10. The system of claim 8, wherein the progress threshold is a multiple of a standard deviation of the distribution.

11. The system of claim 8, wherein the operations further comprise:
    identifying an overhead for the one or more load balancing operations, the overhead specifying a cursor progress cost of performing the one or more load balancing operations, and wherein the progress threshold is further based on the overhead.

12. The system of claim 7, wherein the one or more load balancing operations comprise one or more of:
    instructing one or more other data processors to process one or more data units currently being processed by the first data processor;
    splitting one or more data units being processed by the first data processor into multiple data units and instructing one or more other data processors to process one or more of the multiple data units; or
    throttling one or more other data processors of the distributed processing system.

13. A computer readable medium storing instructions that, when executed by a data processing apparatus, cause the data processing apparatus to perform operations comprising:
    obtaining, by a distributed processing system implemented in the data processing apparatus, the distributed processing system including a plurality of data processors, data units to be processed by the distributed processing system, each data unit having a corresponding timestamp that indicates a time the data unit was created, and wherein the time the data unit was created is prior to a time that the data unit is processed by the data processors;
    distributing the data units among data processors in a distributed processing system for processing by the data processors
    monitoring, for each data processor in the distributed processing system that includes a plurality of data processors, a rate of cursor progress for the data processor based on timestamps of data units that have been processed by the data processor, wherein the rate of cursor progress for each data processor specifies a rate of change of an oldest timestamp of an oldest data unit being processed by the data processor based on the rate of change of the times indicated by the respective timestamps of each oldest data unit processed by the data processor;

determining a progress threshold for the distributed processing system based on the respective rates of cursor progress processed by the plurality of data processors;

determining, based on a first rate of cursor progress for a first data processor processed by the plurality of data processors, that the first rate of cursor progress for the first data processor does not meet the progress threshold; and performing one or more load balancing operations on the distributed processing system in response to determining that the first rate of cursor progress for the first data processor does not meet the progress threshold.

14. The computer readable medium of claim 13, wherein determining a progress threshold comprises:

determining, based on the rate of cursor progress of each data processor in the distributed processing system, a distribution of cursor progress rates for the distributed processing system; and determining the progress threshold based on the distribution of cursor progress rates for the distributed processing system.

15. The computer readable medium of claim 14, wherein the operations further comprise:

obtaining cursor progress rate history that specifies a historical distribution of cursor progress rates for the distributed processing system, and wherein the distribution of cursor progress rates for the distributed processing system is determined based on the cursor progress history.

16. The computer readable medium of claim 14, wherein the progress threshold is a multiple of a standard deviation of the distribution.

17. The computer readable medium of claim 14, wherein the operations further comprise:

identifying an overhead for the one or more load balancing operations, the overhead specifying a cursor progress cost of performing the one or more load balancing operations, and wherein the progress threshold is further based on the overhead.

18. The computer readable medium of claim 13, wherein the one or more load balancing operations comprise one or more of:

instructing one or more other data processors to process one or more data units currently being processed by the first data processor;

splitting one or more data units being processed by the first data processor into multiple data units and instructing one or more other data processors to process one or more of the multiple data units; or throttling one or more other data processors of the distributed processing system.

* * * * *